US006502067B1

(12) United States Patent
Hegger et al.

(10) Patent No.: US 6,502,067 B1
(45) Date of Patent: Dec. 31, 2002

(54) METHOD AND APPARATUS FOR PROCESSING NOISY SOUND SIGNALS

(75) Inventors: Rainer Hegger, Dresden (DE); Holger Kantz, Dresden (DE); Lorenzo Matassini, Dresden (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 0 days.

(21) Appl. No.: 09/465,643

(22) Filed: Dec. 17, 1999

(30) Foreign Application Priority Data

Dec. 21, 1998 (DE) ........................................ 198 59 174

(51) Int. Cl.[7] .......................... G10L 21/02; H04B 15/00
(52) U.S. Cl. ....................... 704/216; 704/226; 381/94.1
(58) Field of Search ................................ 704/226, 227, 704/228, 216, 217, 218, 211; 381/94.1, 94.7; 702/189, 190, 191

(56) References Cited

U.S. PATENT DOCUMENTS

| | | | | | |
|---|---|---|---|---|---|
| 4,769,847 | A | * | 9/1988 | Taguchi | 381/94.7 |
| 5,404,298 | A | * | 4/1995 | Wang et al. | 700/32 |
| 6,000,833 | A | * | 12/1999 | Gershenfeld et al. | 84/600 |
| 6,208,951 | B1 | * | 3/2001 | Kumar et al. | 702/191 |

OTHER PUBLICATIONS

Langi et al., "Consonant characterization using correlation fractal dimension for speech recognition," IEEE WESCANEX '95 Proceedings, May 1995, vol. 1, pp. 208 to 213.*

"On noise reduction methods for chaotic data", Peter Grassberger, et al., CHAOS, vol. 3, No. 2, 1993 pp. 127–141.

"Nonlinear time series analysis", Holger Kantz & Thomas Schreiber, Cambridge Nonlinear Science Series 7 1997 Title page and Table of Contents.

"Analysis of Observed Chaotic Data", Henry D.I. Abarbanel, Springer, Oct. 1995 Title page and Table of Contents.

"Noise reduction in chaotic time series data: A survey of common methods", Eric J. Kostelich and Thomas Schreiber, Sep. 1993, Physical Review E vol. 48, No. 3, pp. 1752–1763.

"Detecting Strange Attractors in Turbulence", Lecture Notes in Math, F. Takens, vol. 898 Springer, New York 1981, 6 pages.

"Embedology", Journal of Statistical Physics, Time Sauer, et al., vol. 65, Nos. 3/4, 1991 pp. 579–616.

"Practical implementation of nonlinear time series methods: The TISEAN package", Rainer Hegger, et al., Oct. 13, 1998, pp. 1–26.

* cited by examiner

*Primary Examiner*—Tālivaldis Ivars Šmits
*Assistant Examiner*—Martin Lerner
(74) *Attorney, Agent, or Firm*—Schnader Harrison Segal & Lewis LLP

(57) ABSTRACT

A method for processing a sound signal y in which redundancy, consisting mainly of almost repetitions of signal profiles, is detected and correlations between the signal profiles are determined within segments of the sound signal. Correlated signal components are allocated to a power component and uncorrelated signal components to a noise component of the sound signal. The correlations between the signal profiles are determined by methods of nonlinear noise reduction in deterministic systems in reconstructed vector spaces based on the time domain.

10 Claims, 9 Drawing Sheets

METHOD AND APPARATUS FOR PROCESSING NOISY SOUND SIGNALS

FIELD OF THE INVENTION

Figure 1:
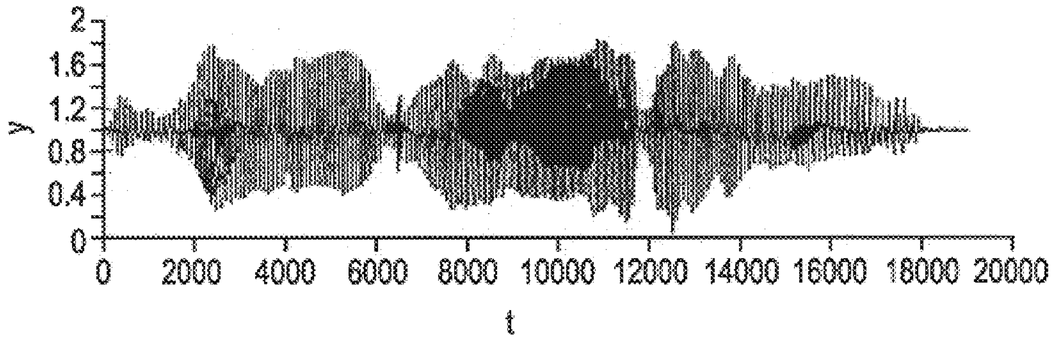

This invention relates to methods for processing noisy sound signals, especially for nonlinear noise reduction in voice signals, for nonlinear isolation of power and noise signals, and for using nonlinear time series analysis based on the concept of low-order deterministic chaos. The invention also concerns an apparatus for implementing the method and use thereof.

BACKGROUND OF THE INVENTION

Noise reduction in the recording, storage, transmission or reproduction of human speech is of considerable technical relevance. Noise can appear as pure measuring inaccuracy, e.g., in the form of the digital error in output of sound levels, as noise in the transmission channel, or as dynamic noise through coupling of the system observed with the outside world. Examples of noise reduction in human speech are known from telecommunications, from automatic speech recognition, or from the use of electronic hearing aids. The problem of noise reduction does not only appear with human speech, but also with other kinds of sound signals, and not only with stochastic noise, but also in all forms of extraneous noise superimposed on a sound signal. There is, therefore, interest in a signal processing method by which strongly aperiodic and non-stationary sound signals can be analyzed, manipulated or isolated in terms of power and noise components.

A typical approach to noise reduction, i.e. to breaking down a signal into certain power and noise components, is based on signal filtering in the frequency band. In the simplest case, filtering is by bandpass filters, resulting in the following problem however. Stochastic noise is usually broadband (frequently so-called "white noise"). But if the power signal itself is strongly aperiodic and thus broadband, the frequency filter also destroys a power signal component, meaning inadequate results are obtained. If high-frequency noise is to be eliminated from human speech by a lowpass filter in voice transmission, for example, the voice signal will be distorted.

Another generally familiar approach to noise reduction consists of noise compensation in sound recordings. Here, for example, human speech superimposed with a noise level in a room is recorded by a first microphone, and a sound signal essentially representing the noise level by a second microphone. A compensation signal is derived from the measured signal of the second microphone that, when superimposed with the measured signal of the first microphone, compensates for the noise from the surrounding space. This technique is disadvantageous because of the relatively large equipment outlay (use of special microphones with a directional characteristic) and the restricted field of use, e.g., in speech recording.

Methods are also known for nonlinear time series analysis based on the concept of low-order deterministic chaos. Complex, dynamic response plays an important role in virtually all areas of our daily surroundings, and in many fields of science and technology, e.g., when processes in medicine, economics, signal engineering or meteorology produce aperiodic signals that are difficult to predict and often also difficult to classify. Thus, time series analysis is a basic approach for learning as much as possible about the properties or the state of a system from observed data.

Known methods of analysis for understanding aperiodic signals are described, for example, by H. Kantz et al. in "Nonlinear Time Series Analysis", Cambridge University Press, Cambridge 1997, and H.D.I. Abarbanel in "Analysis of Observed Chaotic data", Springer, N.Y. 1996. These methods are based on the concept of deterministic chaos. Deterministic chaos means that, although a system state at a certain time uniquely defines the system state at any random later point in time, the system is nevertheless unpredictable for a longer time. This results from the fact that the current system state is detected with an unavoidable error, the effect of which increases exponentially depending on the equation of motion of the system, so that after a relatively short time a simulated model state no longer bears any similarity with the real state of the system.

Methods of noise suppression were developed for time series of deterministic chaotic systems that make no separation in the frequency band but resort explicitly to the deterministic structure of the signal. Such methods are described, for example, by P. Grassberger et al. in "CHAOS", vol. 3, 1993, p 127, by H. Kantz et al. (see above), and by E. J. Kostelich et al. in "Phys. Rev. E", vol. 48, 1993, p 1752. The principle of noise suppression for deterministic systems is described below with reference to FIGS. 10*a–c*.

Figure 10C:
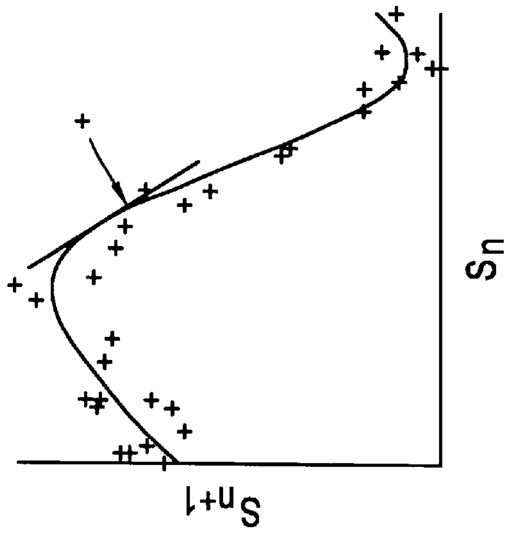
Figure 10B:
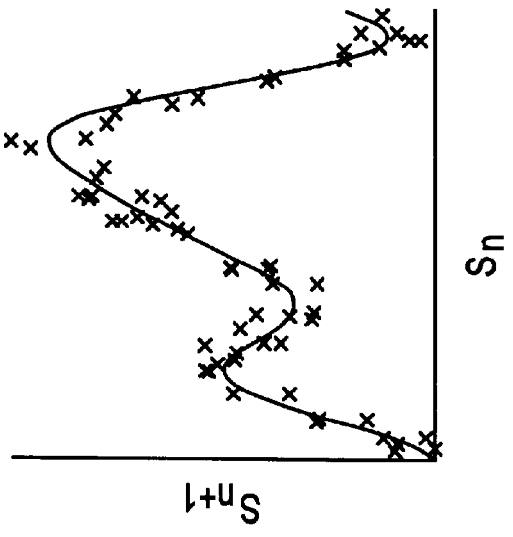
Figure 10A:
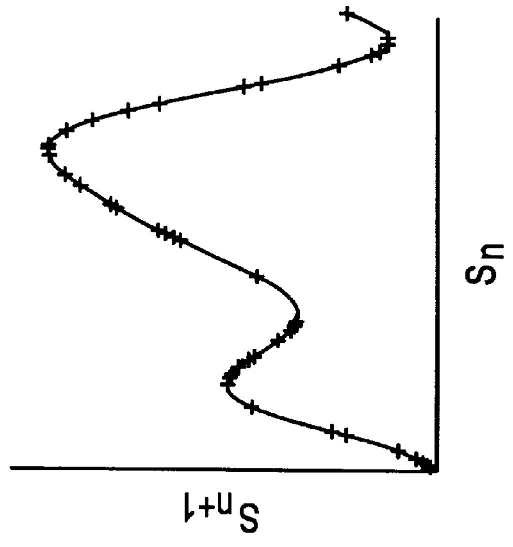

FIGS. 10*a–c* show schematically the dependence of successive time series values for noise-free and noisy systems (exemplified by a one-dimensional relationship). The noise-free data of a deterministic system produce the picture shown in FIG. 10*a*. There is an exact (here one-dimensional) deterministic relationship between one value and the sequential value. The time delay vectors, details of which are explained further below, lie in a low-dimensional manifold in the embedding space. Upon introduction of noise, the deterministic relationship is replaced by an approximative relationship. The data are no longer on the low-dimensional manifold but close to it as shown in FIG. 10*b*. The distinction between power and noise is by dimensionality. Everything leading out of the manifold can be traced to the effect of the noise.

Consequently, the noise suppression for deterministically chaotic signals is made in three steps. First the dimension m of the embedding space is estimated and the dimension Q of the manifold in which the non-noisy data would be. For the actual correction, the manifold is identified in the vicinity of every single point, and finally the observed point is projected to the manifold for noise reduction as shown in FIG. 10*c*.

The disadvantage of the illustrated noise suppression is its restriction to deterministic systems. In a non-deterministic system, i.e., in which there is no unique relationship between one state and a sequential state, the concept of identifying a smooth manifold, as shown in FIGS. 10*a–c*, is not applicable. Thus, for example, the signal amplitudes of speech signals form time series that are unpredictable and correspond to the time series of non-deterministic systems.

The applicability of conventional, nonlinear noise reduction to speech signals has been out of the question to date, especially for the following reasons. Human speech (but also other sound signals of natural or synthetic origin) is very much non-stationary as a rule. Speech is composed of a concatenation of phonemes. The phonemes are constantly alternating, so the sound volume range is changing all the time. Thus, sibilants contain primarily high frequencies and vowels low frequencies. So, to describe speech, equations of motion would be necessary that constantly change in time. But the existence of a uniform equation of motion is the requirement for the concept of noise suppression described with reference to FIGS. 10a–c.

OBJECTS OF THE INVENTION

It is accordingly an object of the invention to achieve an improved signal processing method for sound signals, especially for noisy speech signals, by which effective and fast isolation of the power and noise components of the observed sound signal can be performed with as little distortion as possible.

It is also an object of the invention to provide an apparatus for implementing a method of this kind.

SUMMARY OF THE INVENTION

A first aspect of the invention consists, in particular, in recording non-stationary sound signals, composed of power and noise components, at such a fast sampling rate that signal profiles within the observed sound signal contain sufficient redundancy for the noise reduction. Phonemes consist of a sequence of virtually periodic repetitions (forming the redundancy). The terms periodic and virtually periodic repetition are set forth in detail below. In what follows, uniform use will be made of the term virtually periodic signal profile. The recorded time series of sound signals produce waveforms that repeat at least over certain segments of the sound signal and allow application, on restricted time intervals, of the above mentioned, familiar concept per se of nonlinear noise reduction.

According to another aspect of the invention, virtually periodic signal profiles are detected within an observed sound signal and correlations are determined between the signal profiles so that correlated signal components can be allocated to a power component and uncorrelated signal components to a noise component of the sound signal.

Yet another aspect of the invention is the replacement of temporal correlations by geometric correlations in the time delay embedding space, expressed by neighborhoods in this space. Points in these neighborhoods yield the information necessary for nonlinear noise reduction of the point for which the neighborhood is constructed.

Another aspect of the invention provides an apparatus for processing sound signals comprising a sampling circuit for signal detection, a computing circuit for signal processing, and a unit for the output of time series devoid of noise.

Figure 2:
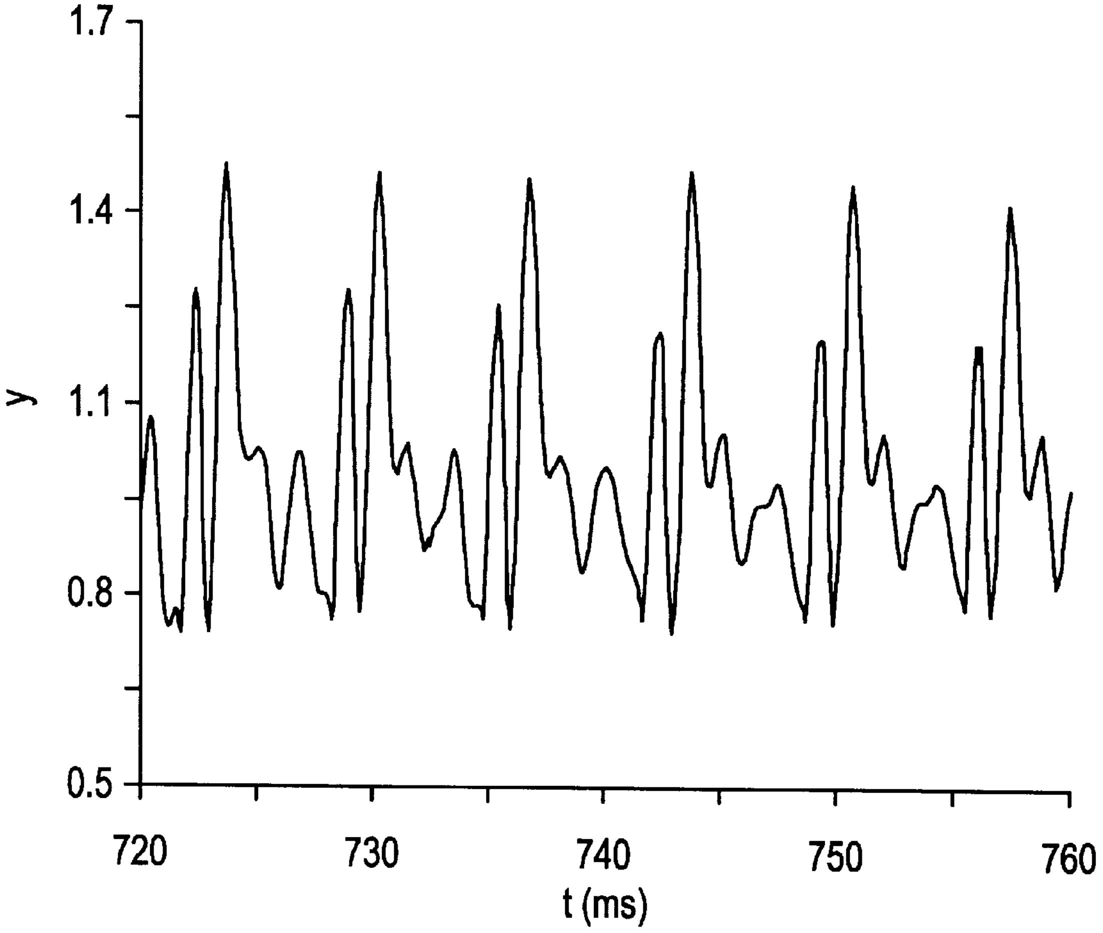
Figure 9:
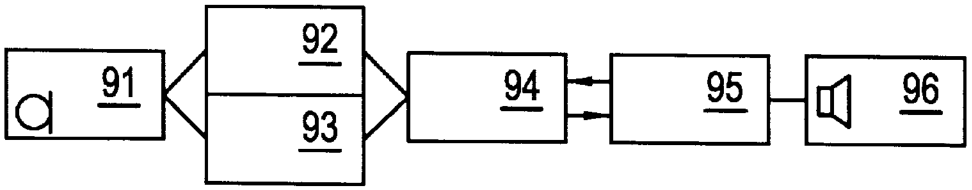
Figure 3:
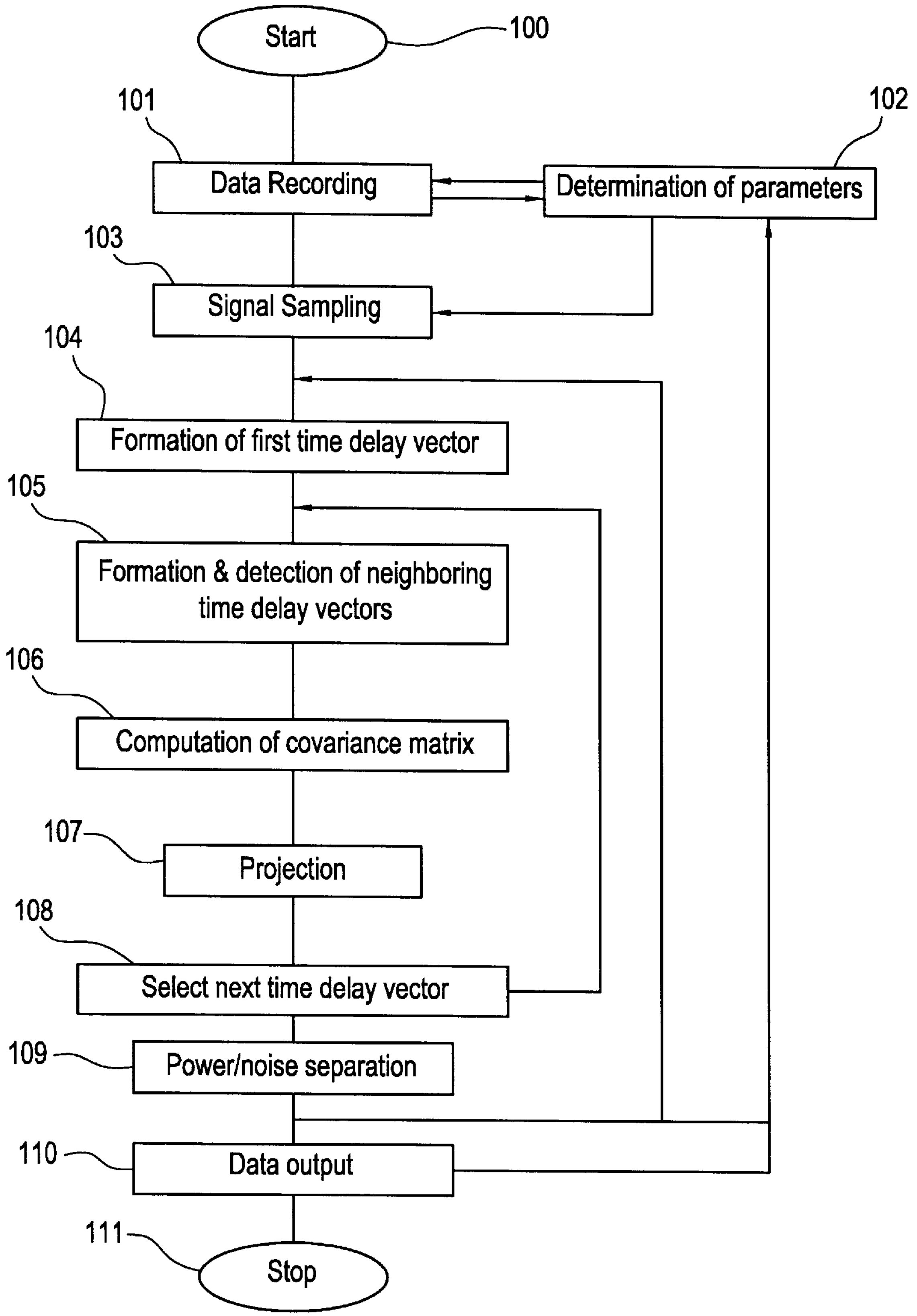
Figure 4A:
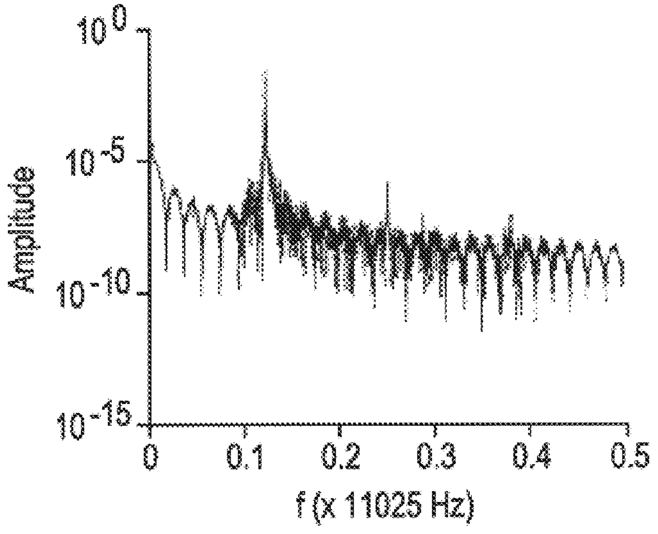
Figure 4B:
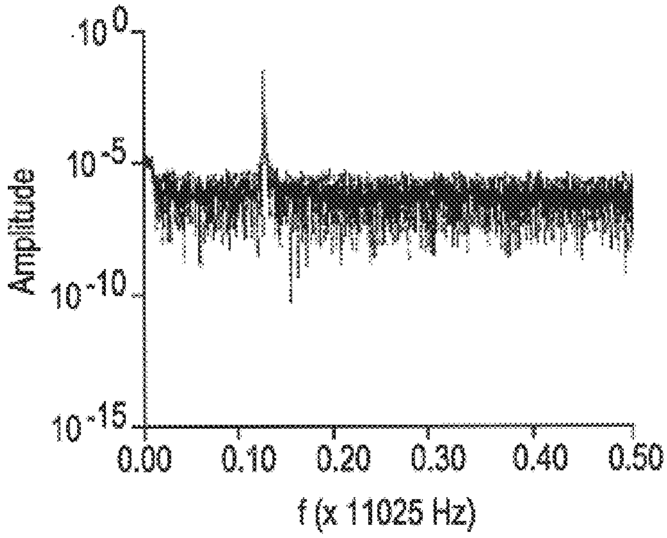
Figure 4C:
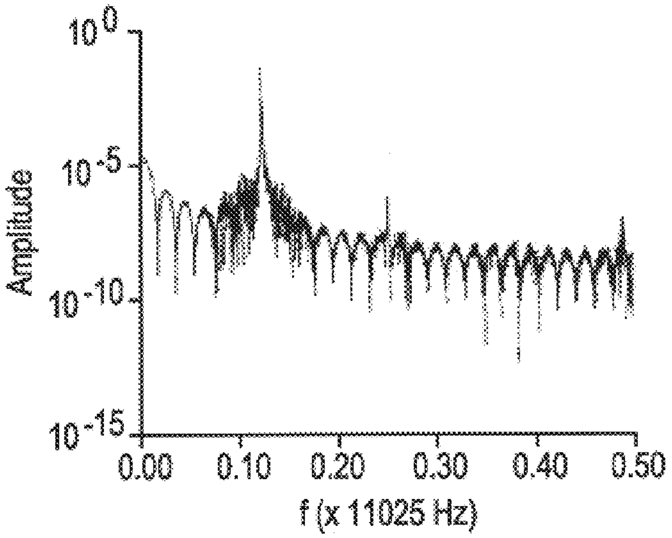
Figure 5A:
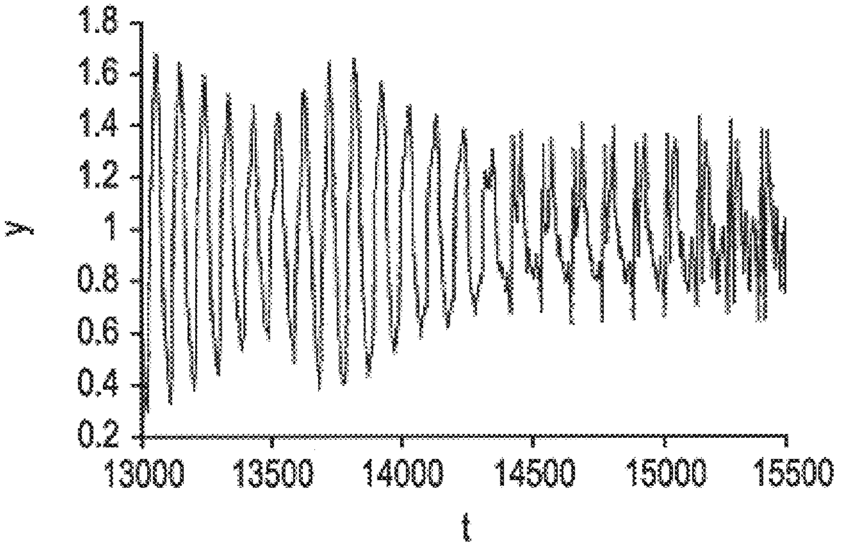
Figure 5B:
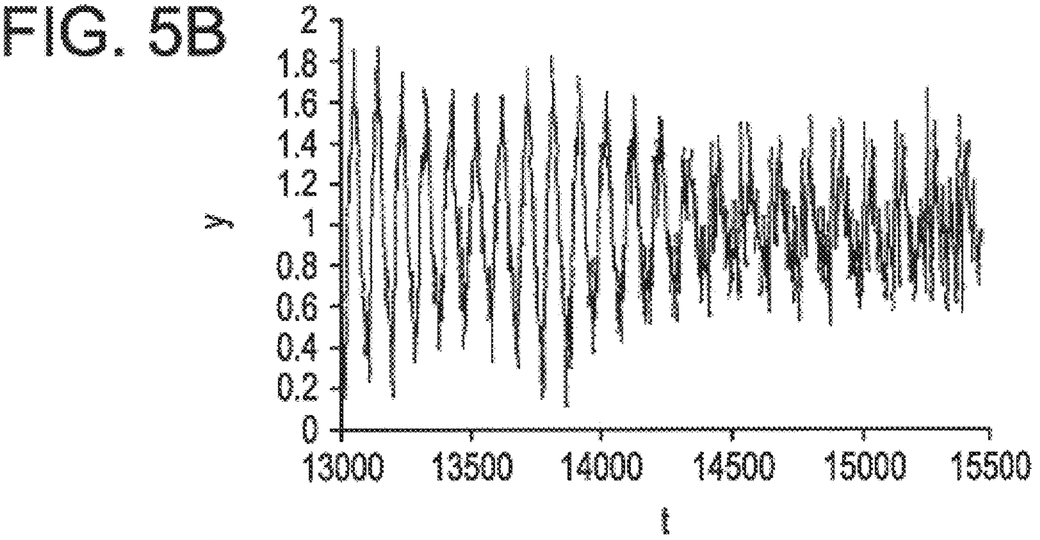
Figure 5C:
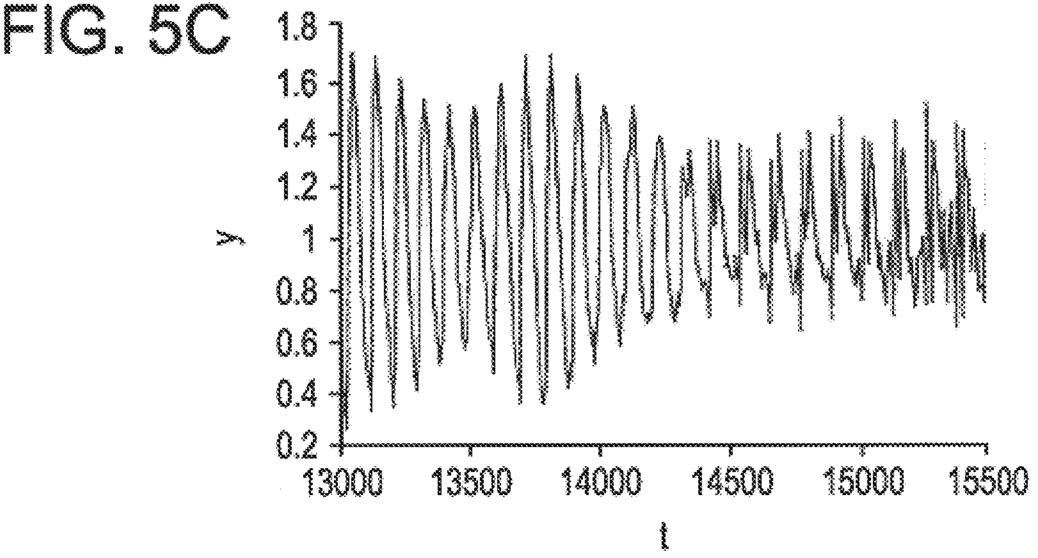
Figure 6:
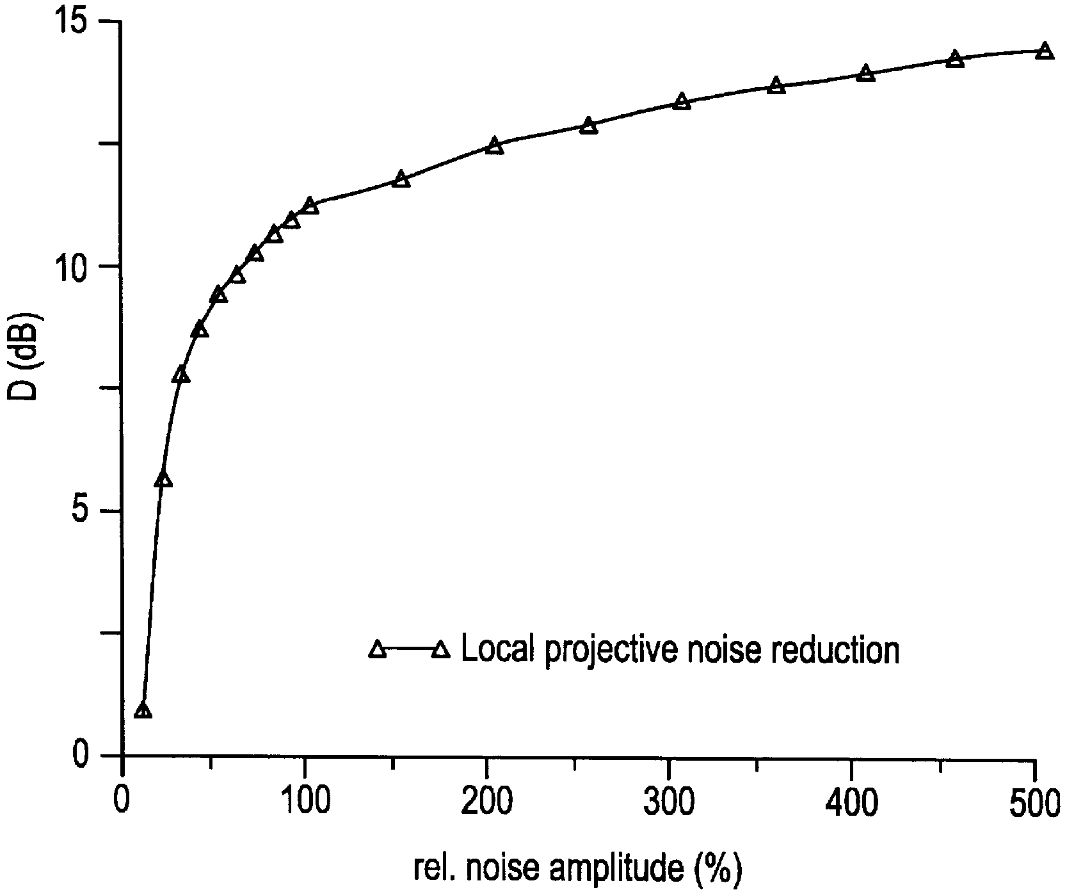
Figure 7:
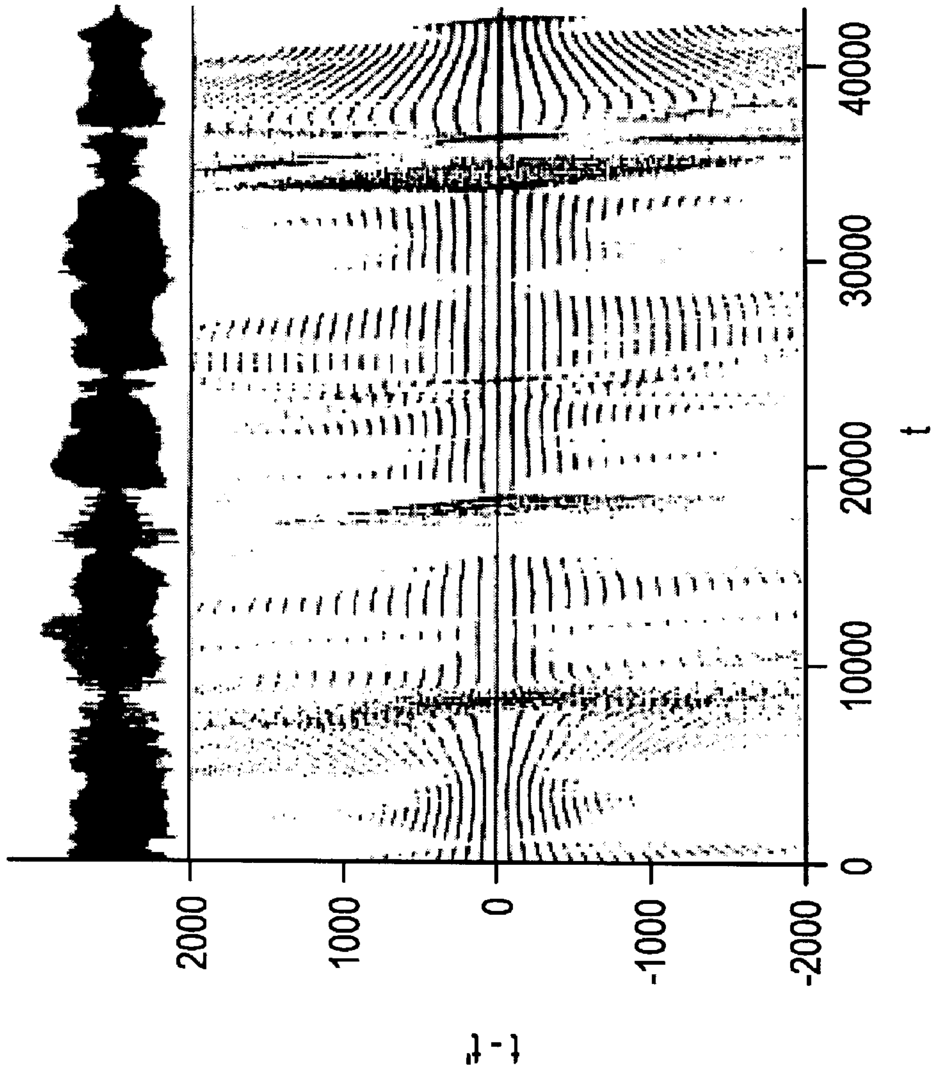
Figure 8:
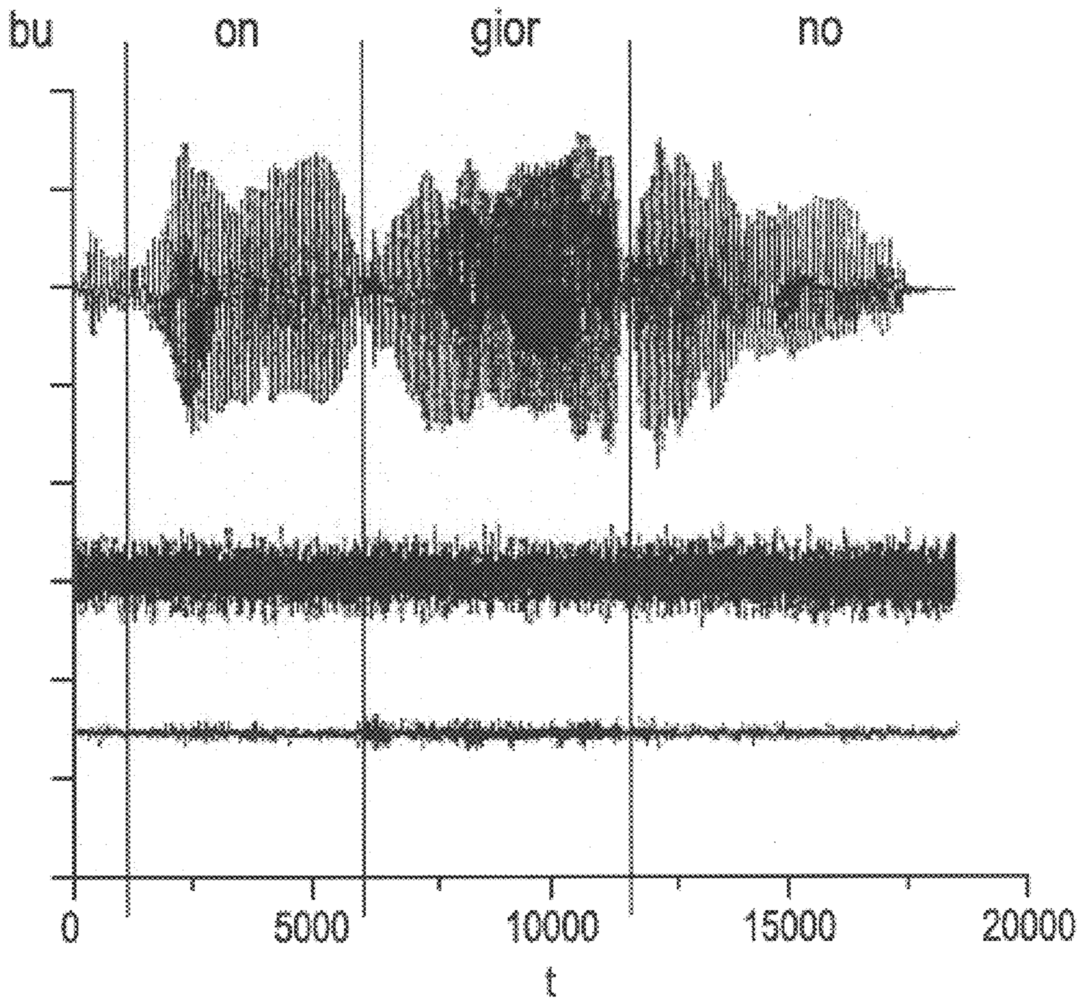

Further details and advantages of the invention are described below with reference to the attached figures, which show:

FIG. 1 A graph of curves illustrating a speech signal;

FIG. 2 A graph of a curve of a time segment of the speech signal illustrated in FIG. 1;

FIG. 3 A flowchart illustrating a method according to the invention;

FIGS. 4a–c Graphs of curves illustrating noise reduction according to the invention on a whistling signal;

FIGS. 5a–c Graphs of curves illustrating the method according to the invention on speech sound signals;

FIG. 6 A graph of noise reduction as a function of noise level;

FIG. 7 A graph of a curve illustrating correlations between signal profiles in a speech signal;

FIG. 8 A curve illustrating a speech signal cleared of noise over time;

FIG. 9 A schematic representation of an apparatus according to the invention; and FIGS. 10a–c Graphs of curves illustrating nonlinear noise reduction in deterministic systems (state of the art).

DETAILED DESCRIPTION OF THE INVENTION

The following description is intended to refer to specific embodiments of the invention described and illustrated in the drawings and is not intended to define or limit the invention, other than in the appended claims.

The invention is explained below taking, as an example, noise reduction on speech signals by utilizing intra-phoneme redundancy. The power component of the sound signal is formed by a speech component x on which a noise component r is superimposed. The sound signal is composed of signal segments formed in the speech example by spoken syllables or phonemes. But the invention is not restricted to speech processing. In other sound signals the allocation of the signal segments is selected differently according to application. Signal processing according to the invention is possible for any sound signal that, although non-stationary, exhibits sufficient redundancy such as virtually periodic repetitions of signal profiles.

Nonlinear Noise Reduction in Deterministic Systems

To begin, details of nonlinear noise reduction are explained as in fact already known from the previously mentioned publications by E. J. Kostelich et al. and P. Grassberger et al. These explanations serve for understanding conventional technology. As regards details of nonlinear noise reduction, the quoted publications by E. J. Kostelich et al. and P. Grassberger et al. are fully incorporated by reference into the present description. The explanation relates to deterministic systems. Translation of conventional technology to non-deterministic systems according to the invention is explained below.

The states x of a dynamic system are described by an equation of motion $x_{n+1}=F(x_n)$ in a state space (phase space). If the F function is not known, it can be approximated linearly from long time series $\{x_k\}$, k=1, . . . , N by identifying all points in a neighborhood $U_n$ of a point $x_n$ and minimizing the function (1).

$$s_n^2 = \sum_{k:x_k \in U_n} (A_n x_k + b_n - x_{k+1})^2, \tag{1}$$

$s_n^2$ is a prediction error in relation to the factors $A_n$ and $b_n$. The implicit expression $A_n x_k + b_n - x_{k+1} = 0$ illustrates that the values corresponding to the above equation of motion are restricted to a hyperplane within the observed state space.

If the state $x_k$ is superimposed with random noise $r_k$ to become a real state $y_k=x_k+r_k$, the points belonging to the neighborhood $U_n$ will no longer be confined to the hyperplane formed by $A_n$ and $b_n$ but scattered in a region around the hyperplane. Nonlinear noise reduction now means projecting the noisy vectors $y_n$ onto the hyperplane. Projection of the vectors to the hyperplane is determined by known methods of linear algebra.

In time series such as speech signals only a sequence of scalar values is recorded. From them, phase space vectors have to be reconstructed by the method of delays, as described by F. Takens under the title "Detecting Strange Attractors in Turbulence" in "Lecture Notes in Math", vol. 898, Springer, New York 1981, or by T. Sauer et al. in "J. Stat. Phys.", vol. 65, 1991, p 579, and as is illustrated in what follows. These publications are also fully incorporated by reference into the present specification.

Proceeding from a scalar time series $s_k$, time delay vectors in an m-dimensional space are formed according to $\hat{s}_n=(s_n, s_{n-\tau}, \ldots s_{n-(m-1)\tau})$. The parameter m is the embedding dimension of the time offset vectors. The embedding dimension is selected in dependence on the application and is greater than twice the value of the fractal dimension of the attractor of the observed dynamic system. The parameter τ is a time lag for the consecutive elements of the time series. The time delay vector is thus an m-dimensional vector whose components comprise a certain time series value and (m-1) preceding time series values. It describes the evolution of the system with time during a time range or embedding window of the duration m•τ. For each new sample the embedding window shifts by a sampling interval within the overall time series. The time lag τ is in turn a value selected as a function of the sampling of the time series. If the sampling rate is high, a larger lag may be chosen to avoid processing redundant data. If the system alters fast (low sampling rate), a smaller lag must be chosen. The choice of the lag τ is thus a compromise between redundancy and de-correlation between consecutive measurements.

The above mentioned projection of the states to the hyperplane is made using the time delay vectors according to a calculation described by H. Kantz et al. in "Phys. Rev. E", vol. 48, 1993, p 1529. This publication is also fully introduced by reference into the present description. All neighbors in the time delay embedding space are searched for each time delay vector $\hat{s}_n$, i.e., the neighborhood $U_n$ is formed. Then the covariance matrix is computed according to equation (2), whereby the character ^ means that the mean on the environment $U_n$ has been subtracted.

$$C_{ij} = \sum_{U_n} (\hat{s}_k)_i (\hat{s}_k)_j \tag{2}$$

The singular values are determined for the covariance matrix $C_{ij}$. The vectors corresponding to the Q largest singular values represent the directions that span the hyperplane defined by the above mentioned $A_n$ and $b_n$.

To reduce the noise from the values $\hat{s}_n$, the time delay vectors are projected to the Q dominant directions that span the hyperplane. For each element of the scalar time series this means m different corrections that are combined in appropriate fashion. The operation described can be repeated with the noise-reduced values for another projection.

The identification of neighbors, the calculation of the covariance matrix and determination of dominant vectors, corresponding to a predetermined number Q of largest singular values, represent the search for correlations between system states. In deterministic systems this search is related to the assumed equation of motion of the system. How, in the invention, the search for correlations between system states in non-deterministic systems is made is described below.

Nonlinear Noise Reduction in Non-deterministic Systems

In a deterministic system the assumed invariance with time of the equation of motion serves as extra information for determining the correlations between states. Contrary to this, in a non-deterministic, non-stationary system determination of the correlation between states as proposed by the invention is based on the following extra information.

The invention makes use of redundancy in the signal. Due to the non-stationarity, one distinguishes between true redundancy and accidental similarities of parts of the signal which are uncorrelated. This is achieved by using a higher embedding dimension and a larger embedding window than necessary to resolve the instantaneous dynamics. To be more specific, a voice signal is a concatenation of phonemes. Every single phoneme is characterised by a characteristic wave form, which virtually repeats itself several times. A time delay embedding vector which covers one full such wave thus can be unambiguously allocated to a given phoneme and not be mis-interpreted to belong to a different one with a different characteristic wave form. Within a phoneme, these wave forms are altered in a definite way, so that no exact repetitions occur. This latter property is what we define as virtually periodic repetitions.

Human speech is a string of phonemes or syllables with characteristic patterns as regards amplitude and frequency. These patterns can be detected by observing electrical signals of a transducer (microphone) for example. On medium time scales (e.g. within a word) speech is non-stationary, and on long time scales (e.g. beyond a sentence) it is highly complex, whereby many active degrees of freedom and possibly long-range correlations appear. On short time scales (time ranges corresponding for the most cases to the length of a phoneme or a syllable) repetitive patterns or profiles appear in the course of a signal, and these will be explained below. Details of the concrete calculations are implemented analogously to conventional noise reduction and can be found in the above mentioned publications.

FIG. 1 shows as an example the Italian greeting "buon giorno" as a wave train. This is the signal amplitude recorded with a sampling frequency of 10 kHz with the (arbitrarily normalized) time series values $y_n$ versus the non-dimensional time counting scale. This signal amplitude was derived from an extremely low-noise, digital voice recording. The total time from n=0 through n=20000 is a range of approx. 2 s.

Representation of a time segment of the amplitude pattern shown in FIG. 1 with high time resolution produces the picture in FIG. 2. It can be seen that the amplitude pattern within certain signal segments (e.g. phonemes) exhibits the illustrated periodic repetitions. In the example, a signal profile repeats in time intervals with a width of about 7 ms. A special advantage of the invention is the fact that the effectiveness of the noise reduction does not depend on the absolute exactness of the presented periodicity. Most often no exact repetitions appear but, instead, there is a systematic modification of the typical waveform of a signal profile within a phoneme. But this variation is considered in the method detailed below, because it represents the freedom in the directions remaining after the projection Q. To allow for the variation (deviation from exact repetitions), the term virtually periodic signal profile is used, which only differs from an exactly periodic signal profile in its systematic variability.

In the time delay embedding space (with appropriately chosen parameters m and τ; see above), the shown repetitions form neighboring points in the state space (or vectors pointing to these points). Thus, if the variability in these points through superposition of noise is greater than natural variability through non-stationarity, approximate identification of the manifold and projection onto it will reduce the noise more strongly than influencing the actual signal. This is the basic approach of the method according to the invention, explained below with reference to the flowchart in FIG. 3.

FIG. 3 is an overview schematic showing basic steps of the method according to the invention. But the invention is not restricted to this procedure. Depending on the application, modification is possible in terms of data recording, determination of parameters, the actual computation for reducing noise, the separation of power and noise components, and the output of the result.

According to FIG. 3, the start 100 is followed by data recording 101 and determination of parameters 102. Data recording 101 comprises the recording of a sound signal by transforming the sound into an electrical variable. Data recording can be configured for analog or digital sound recording. Depending on the application, the sound signal is saved in a data memory or, for real-time processing, in a buffer memory (see FIG. 9). Determination of parameters 102 comprises the selection of parameters suitable for later searching for redundancies between different vectors in the sound signal. These parameters are, in particular, the embedding dimension m, the time lag $\tau$, the diameter $\epsilon$ of the neighborhoods U in the time delay embedding space to identify neighbors, and the number Q of phase space directions onto which the projection will be done.

For speech signal processing the embedding dimension m can be in the range of about 10 to 50 for example, preferably about 20 to 30, and the time lag $\tau$ in the range of about 0.1 to 0.3 ms, so that the embedding window m $\tau$ covers preferably about 3 to 8 ms. These values take into account the typical phoneme duration of about 50 to 200 ms and the complexity of the human voice. Typical signal profiles range between 3 and 15 ms due to the pitch of human voice of about 100 Hz. FIG. 2, for example, shows repetitions of the signal profile after 7 ms, respectively. Determination of parameters 102 (FIG. 3) can interact with data recording 101 or be made as part of a pre-analysis. For a pre-analysis the embedding dimension m and the dimension of the diversity (corresponding to the parameter Q), in which the noise-free data would be, are estimated. It is also possible for determination of parameters 102 to be repeated during the process, for example as a correction in response to the result of power/noise separation 109 (see below).

Signal sampling 103 is based on the recorded values and the determined parameters. Signal sampling 103 is intended to determine the values of the time series $y_n$ from the data according to the previously defined sampling parameters. The following steps 104 through 109 represent the actual computation of the projections of the real sound signals to noise-free sound signals or states.

Step 104 comprises the formation of the first time delay vector for the beginning of the time series (e.g. according to FIG. 2). It is not required to perform the noise reduction in time ordering, but it is preferable, especially for real-time or quasi-real-time processing. The first time delay vector comprises m signal values $y_n$ succeeding one another with time lag $\tau$ as m components. Then, in step 105, neighboring time delay vectors are formed and detected. The neighboring vectors relate to very similar signal profiles as the one represented by the first vector. They constitute the first neighborhood U. If the first vector represents a profile which is part of a phoneme, the neighboring vectors corresponds mostly to the virtually repeating signal profiles inside the same phoneme. In speech processing, typically some 15 signal profiles repeat within a phoneme. The number of neighboring vectors determined can be between about 5 and 20 for example.

The next step is computation of the covariance matrix 106 according to the above equation (2). The vectors entering this matrix are those from the basic neighborhood U as defined in step 105. Step 106 then comprises determination of the Q biggest singular values of the covariance matrix and the associated singular vectors in the m-dimensional space.

As part of the following projection 107, all components of the first time delay vector are eliminated that are not in the subspace spanned by the determined Q dominant singular vectors. The value Q is in the range from about 2 to 10, preferably between about 4 and 6. In a modified procedure, the value Q can be Zero (see below).

The relatively small number Q representing the dimension of the subspace to which the delay vectors are projected is a special advantage of the invention. It was found that the dynamic range of the waves within a given phoneme has a relatively small number of degrees of freedom once identified within a high-dimensional space. Hence, relatively few neighboring states are necessary to compute the projection. Only the largest singular values and corresponding singular vectors of the covariance matrix are relevant for detecting the correlation between the signal profiles. This result is surprising because nonlinear noise reduction per se was developed for deterministic systems with extensive time series. Another special advantage is the relatively little time required for the computation.

Then, the next time delay vector is selected in step 108 and the sequence of steps 105 through 107 is repeated, forming new neighborhoods and new covariance matrices. This repetition is made until all time delay vectors which can be constructed from the time series have been processed.

Also, formation or detection of the neighboring vectors (step 105) can be made at a higher dimension than the projection 107. The high dimension in searching for the neighbor facilitates selection of neighbors which represent profiles stemming from the same phoneme. This invention thus implicitly selects phonemes without any speech model. However, as explained above, the dynamics inside a phoneme represent substantially less degrees of freedom, so that it is possible to work in a low dimension and fast within the subspace spanned by the singular vectors. Sound signal processing for real-time applications is for the most part consecutive for the phonemes, so that phoneme by phoneme is entirely processed and a generated output signal is free of noise. This output signal has a lag of about 100 to 200 ms compared to the detected (input) sound signal (real-time or quasi-real-time application).

Steps 109 and 110 concern formation of the actual output signal. The purpose of step 109 is to separate the power and noise signals. A time series element $s_k$, free of noise, is formed by averaging over the corresponding elements from all time delay vectors that contain this element. Weighted instead of simple averaging can be introduced. After step 109 it is possible to provide a return to before step 104. The time series elements free of noise then form the input variables for the renewed formation of time delay vectors and their projection to the subspace corresponding to the singular vectors. This repetition in the process is not necessary, but it can be duplicated or triplicated to improve noise reduction. It is also possible to return to the determination of parameters 102 after step 109, if the power component that appears after step 109 differs less than expected (e.g. through less than a predetermined threshold) from the unprocessed sound signal. Decision mechanisms not shown in the process can be integrated for this purpose. Step 110 is data output. In noise reduction the speech signal reduced in noise is output as the power component. Or alternatively, depending on the application, the noise component may be output or stored.

The above procedure can be modified with regard to the parameter determination in consideration of the following aspects. First, the dimension of the manifold (corresponding to the parameter Q), in which the noise-free data would be, can vary in the course of a signal. The dimension Q can vary from phoneme to phoneme. As a further example, the dimension Q is Zero during a break between two spoken words or any other kind of silence. Second, a selection of relevant inherent time delay vectors onto which the state is to be projected is impossible if the noise is relatively high (about 50%). All inherent values of the correlation matrix would be nearly the same in this situation.

Accordingly, the procedure can implement a variation of the parameter Q as follows. Instead of a fixed projection dimension Q, it is adaptively varied and individually determined for every covariance matrix. A constant f<1 is defined in step 102. The constant f is established empirically. It depends on the type of signal (e. g. f=0.1 for speech). The maximum singular value of a given covariance matrix multiplied by the constant f represents a threshold value. The number of those singular values which are larger than the threshold value is then the value of Q used for the projection, provided it does not exceed a maximum value which can be, for example, 8. In the latter case, all singular values of a given covariance matrix are so similar that no pronounced linear subspace can be selected and thus Q is chosen to be Zero. Instead of projection, the actual delay vector is then replaced by the mean value of its neighborhood.

By this modification, the performance of the procedure is increased dramatically in particular for high noise levels.

EXAMPLES

In what follows the signal processing of the invention is illustrated in two examples. In the first example, the processed sound signal is a human whistle (see FIGS. 4*a–c*). The second example focuses on the above mentioned words "buon giorno" (see FIGS. 5 through 8).

FIGS. 4*a–c* shows the power spectrum for a human whistle lasting 3 s. A whistle is in effect aperiodic signal with characteristic harmonics and only few non-stationarities. FIG. 4*a* shows the power spectrum of the original recording. Numerical addition of 10% noise produces the spectrum presented in FIG. 4*b*. In the time domain, this delivers the input data for step 101 of the process (FIG. 3). After noise reduction according to the invention, the power spectrum of the new time series is as shown in FIG. 4*c*. This shows the complete restoration of the original, noise-free signal from FIG. 4*a*. FIGS. 4*a* through 4*c* demonstrate a special advantage of the invention compared to a conventional filter in the frequency domain. A filter would cut off all power components with an amplitude of less than $10^{-6}$, so the noise-cleaned spectrum would only have the peak at 0 and the peak about the fundamental. Consequently the time series obtained from the inverse transformation would be entirely without harmonics, and would sound very "synthetic." Such drawbacks are avoided by noise reduction as in the invention.

FIGS. 5*a–c* shows results in an example of curves for processing sound signals. FIG. 5*a* shows a section from the noise-free wave train of the words "buon giorno" referred to the signal pattern as in FIG. 1 analogous to FIG. 2. One can see the repetition of signal profiles during short time intervals which contains the necessary redundancy for reducing the noise. FIG. 5*b* shows the wave train after addition of synthetic noise. Noise reduction according to the invention produces the picture in FIG. 5*c*. It can be seen that the original signal is closely reconstructed.

The operability of noise reduction according to the invention was tested for different kinds of noise and amplitudes. As a measure of the performance of the noise reduction, it is possible to look at attenuation D (in dB) as in equation (3):

$$D=10\ \log((\Sigma(\hat{y}_k-x_k)^2)/(\Sigma(y_k-x_k)^2)) \tag{12}$$

where $x_k$ is the noise-free signal (power component), $y_k$ the noisy signal (input sound signal) and $\hat{y}_k$ the signal after noise reduction according to the invention.

FIG. 6 illustrates the attenuation D of nonlinear noise reduction versus relative noise amplitude (variance of the noise component/variance of the power component). It shows that the attenuation is increased even for high relative noise amplitudes in the range of more than 100%.

FIGS. 7 and 8 show further details of speech noise reduction. FIG. 7 illustrates the appearance of repeating signal profiles within the phoneme train shown in the upper part of the Figure. A curve is printed in the lower part of the Figure as a function of a (random) time index i that consists of points formed under the following conditions. For each point in time i, the associated time delay vector $\hat{s}_i$ and the set of all time delay vectors $\hat{s}_j$ is considered. If the modulus of the difference vector between $\hat{s}_i$ and $\hat{s}_j$ is smaller than a predetermined limit, a point is printed at i–j. The points form more or less extended lines. The line structures show that the virtual periodicities of the signal profiles explained above appear within the phonemes. The gaps in these line segments prove that the neighborhoods are able to distinguish between different phonemes. The number of intra-phoneme neighbors is especially large for line structures that are especially extended in the direction of the ordinate. But it can also be seen that as a rule no repetitions occur for $|i-j|>2000$.

FIG. 8 shows in turn, taking the words "buon giorno" as an example, the noise-free signal in the upper part of the Figure, the synthetic noise added in the middle part, and the noise remaining after noise reduction in the lower part. The ordinate scaling is identical in all three cases. The remaining noise (bottom of the Figure) shows a systematic variation indicating that the success of noise reduction according to the invention itself depends on the sound signal, i.e., the concrete phoneme.

The subject of the invention is also an apparatus for implementing the method according to the invention. As shown in FIG. 9, a noise reduction configuration comprises a pickup 91, a data memory 92 and/or a buffer memory 93, a sampling circuit 94, a computing circuit 95, and an output unit 96.

The components of the invented apparatus presented here are preferably produced as a firmly interconnected circuit arrangement or integrated chip.

It should be emphasized that for the first time the use of nonlinear noise reduction methods for deterministic systems is described for processing non-stationary and non-deterministic sound signals. This is surprising because the requirement of the familiar noise reduction methods is in particular stationarity and determinism of the signals to be processed. It is this requirement that is violated in the case of non-stationary sound signals when considering the global signal characteristic. Nevertheless, use of nonlinear noise reduction restricted to certain signal classes produces excellent results.

The invention exhibits the following advantages. For the first time a noise reduction method is created for sound signals that works substantially free of distortion and can be implemented with little technical outlay. The invention can be implemented in real-time or virtual real-time. Certain parts of the signal processing according to the invention are compatible with conventional noise reduction methods, with the result that familiar additional correction methods or fast data processing algorithms are easily translated to the invention. The invention allows effective isolation of power and noise components regardless of the frequency spectrum of the noise. Thus, chromatic noise or isospectral noise in particular can be isolated. The invention can be used not only for stationary noise but also for non-stationary noise if the typical time scale on which the noise process alters its properties is longer than 100 ms (this is an example that relates especially to the processing of speech signals and may also be shorter for other applications).

The invention is not restricted to human speech, but is also applicable to other sources of natural or synthetic sound. In the processing of speech signals it is possible to isolate a human speech signal from background noise. It is not possible to isolate single speech signals from one another, however. This means that one voice is observed as a power component, for example, and another voice as a noise component. The voice representing the noise component constitutes non-stationary noise of the same time scale that is not treated.

Preferred applications for the invention are named below. In addition to noise reduction in speech signals as already mentioned, the invention can also be used to reduce noise in hearing aids and to improve computer-aided, automatic speech recognition. As regards speech recognition, the noise-free time series values or sectors can be compared to table values. The table values may represent the corresponding values or vectors of predetermined phonemes. Automatic speech recognition can thus be integrated with the noise reduction method.

There are further applications in telecommunication and in processing the signals of other sound sources than the human voice, e.g. animal sounds or music.

What is claimed is:

1. A method for processing a sound signal y in which redundant signal profiles are detected within segments of the sound signal and repetitive patterns are detected within said signal profiles, whereby repetitive signal components are allocated to a power component and non-repetitive signal components are allocated to a noise component of the sound signal, wherein said sound signal y is composed of a speech component x and a noise component r, and is processed in each signal segment according to the following steps:

a) recording of a large number of sound signal values $y_k=x_k+r_k$ with a sampling interval $\tau$;

b) forming a plurality of time delay vectors, each of which consists of components $y_k$ whose number m is an embedding dimension and whose numbers k are determined from an embedding window of width $m \cdot \tau$, wherein for each single one of these vectors a neighborhood U is composed of all delay vectors whose distance to the given one is smaller than a predefined value $\epsilon$;

c) determining correlations between the time delay vectors and projection of the time delay vectors onto a number Q of singular vectors; and d) determining signal values that form a speech signal substantially corresponding to said speech component $x_k$, or a noise signal substanially corresponding to said noise component $r_k$.

2. The method according to claim 1, wherein said number k of time delay vectors forming said neighborhood depends on the redundancy stored in almost repetitions of signal profiles.

3. The method according to claim 1, wherein said correlations between the time delay vectors are extracted by the identification of said neighborhood U and by computing a covariance matrix on said vectors belonging to said neighborhood U.

4. The method according to claim 1, wherein steps b) and c) are repeated at least for all entries of a time series.

5. The method according to claim 1, wherein said sound signal is a speech signal.

6. The method according to claim 1, wherein said embedding window $m \cdot \tau$ is in the range from about 1 to 20 ms.

7. The method according to claim 1, wherein in step c) said time delay vectors are projected onto a Q-dimensional manifold with adaptively adjusted Q.

8. The method according to claim 5, wherein noise is reduced in telecommunications speech signals.

9. The method according to claim 5, wherein noise is reduced in speech signals passing through a hearing aid.

10. The method according to claim 5, wherein noise is reduced in an automatic speech recognition process.

* * * * *